United States Patent
Mohl

(10) Patent No.: US 9,652,178 B2
(45) Date of Patent: May 16, 2017

(54) SYSTEMS AND METHODS FOR PROTECTING VIRTUAL MACHINE DATA

(71) Applicant: Symantec Corporation, Mountain View, CA (US)

(72) Inventor: Steven Mohl, Sanford, FL (US)

(73) Assignee: Veritas Technologies, Mountain View, CA (US)

( * ) Notice: Subject to any disclaimer, the term of this patent is extended or adjusted under 35 U.S.C. 154(b) by 183 days.

(21) Appl. No.: 14/022,225

(22) Filed: Sep. 10, 2013

(65) Prior Publication Data

US 2015/0074362 A1 Mar. 12, 2015

(51) Int. Cl.
G06F 12/00 (2006.01)
G06F 3/06 (2006.01)
G06F 11/14 (2006.01)

(52) U.S. Cl.
CPC .......... *G06F 3/0667* (2013.01); *G06F 3/0619* (2013.01); *G06F 3/0673* (2013.01); *G06F 11/1456* (2013.01); *G06F 11/1464* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 7,669,020 B1 | 2/2010 | Shah et al. | |
| 7,882,073 B1 * | 2/2011 | Ojalvo | 707/654 |
| 2006/0225065 A1 | 10/2006 | Chandhok et al. | |
| 2007/0244938 A1 | 10/2007 | Michael et al. | |
| 2008/0244577 A1 * | 10/2008 | Le et al. | 718/1 |
| 2009/0313447 A1 * | 12/2009 | Nguyen et al. | 711/162 |
| 2010/0011178 A1 | 1/2010 | Feathergill | |
| 2011/0010515 A1 * | 1/2011 | Ranade | 711/162 |
| 2013/0262390 A1 * | 10/2013 | Kumarasamy | H04L 41/08 707/649 |
| 2014/0047439 A1 * | 2/2014 | Levy | H04L 67/34 718/1 |

\* cited by examiner

*Primary Examiner* — Daniel Tsui
(74) *Attorney, Agent, or Firm* — FisherBroyles, LLP

(57) ABSTRACT

A computer-implemented method for protecting virtual machine data may include (1) receiving a request to perform a granular backup operation on data stored by a guest system within a virtual machine, (2) identifying a storage container that comprises an agent that performs backup operations, (3) attaching the storage container to the virtual machine in response to the request, and (4) performing the granular backup operation by sending an instruction to the guest system within the virtual machine to execute the agent. Various other methods, systems, and computer-readable media are also disclosed.

20 Claims, 6 Drawing Sheets

SYSTEMS AND METHODS FOR PROTECTING VIRTUAL MACHINE DATA

BACKGROUND

In the digital age, organizations increasingly rely on digitally stored data. To protect against data loss, an organization may use a backup system to back up important data. In some cases, an organization may also handle and store data via virtual machines. Accordingly, a backup system may back up data from a virtual disk to preserve data handled by a virtual machine.

Some traditional backup systems may back up virtual machine data by backing up virtual machine disk files. Unfortunately, these traditional backup systems may prove inflexible and/or inefficient when an organization wishes to back up and restore data of individual applications within the virtual machine. Some traditional backup systems may back up virtual machine data by installing a backup application within a virtual machine so that the backup application may have a logical view of and target individual applications running within the virtual machine. However, some virtualization environments may include hundreds or thousands of virtual machines. Installing, administering, and updating backup applications for thousands of virtual machines may create a heavy administrative burden and introduce many possibilities for human error.

Accordingly, the instant disclosure identifies and addresses a need for additional and improved systems and methods for protecting virtual machine data.

SUMMARY

As will be described in greater detail below, the instant disclosure generally relates to systems and methods for protecting virtual machine data by attaching a storage container that includes a backup agent to one or more virtual machines and then executing the backup agent from within the virtual machines. In one example, a computer-implemented method for protecting virtual machine data may include (1) receiving a request to perform a granular backup operation on data stored by a guest system within a virtual machine, (2) identifying a storage container that includes an agent that performs backup operations, (3) attaching the storage container to the virtual machine in response to the request, and (4) performing the granular backup operation by sending an instruction to the guest system within the virtual machine to execute the agent.

In some examples, the computer-implemented method may further include attaching the storage container to at least one additional virtual machine to perform at least one additional granular backup operation on data stored by an additional guest system within the additional virtual machine. Additionally or alternatively, the computer-implemented method may further include attaching an additional instance of the storage container to at least one additional virtual machine to perform at least one additional granular backup operation on data stored by an additional guest system within the additional virtual machine.

In some examples, performing the granular backup operation may include configuring the guest system to execute the agent after attaching the storage container to the virtual machine and before executing the agent. In one embodiment, the agent may collect metadata from within the guest system that describes backup data produced by the granular backup operation. Additionally or alternatively, the agent may quiesce at least one application within the guest system to prepare data corresponding to the application for the granular backup operation.

In some examples, the computer-implemented method may further include detaching the storage container from the virtual machine in response to completing the granular backup operation. In one embodiment, the granular backup operation may include a granular restoration operation that restores data to the guest system within the virtual machine.

In one embodiment, a system for implementing the above-described method may include (1) an identification module that identifies a storage container that may include an agent that performs backup operations, (2) an attaching module that attaches the storage container to the virtual machine in response to the request, (3) a performing module that performs the granular backup operation by sending an instruction to the guest system within the virtual machine to execute the agent, and (4) at least one processor configured to execute the receiving module, the identification module, the attaching module, and the performing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a request to perform a granular backup operation on data stored by a guest system within a virtual machine, (2) identify a storage container that includes an agent that performs backup operations, (3) attach the storage container to the virtual machine in response to the request, and (4) perform the granular backup operation by sending an instruction to the guest system within the virtual machine to execute the agent.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
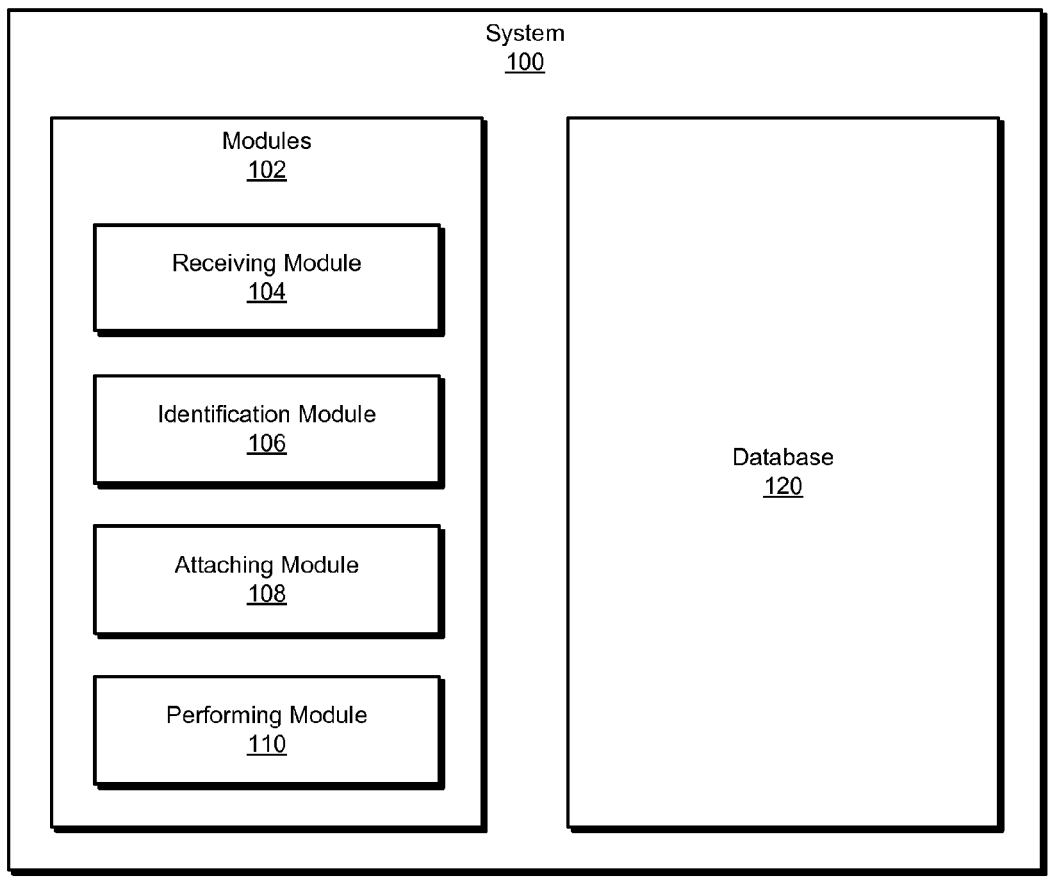
FIG. 1 is a block diagram of an exemplary system for protecting virtual machine data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for protecting virtual machine data. As will be explained in greater detail below, by attaching a storage container that includes a backup agent to one or more virtual machines and then executing the backup agent from within the virtual machines, the systems and methods described herein may provision multiple virtual machines with granular backup and/or restore capabilities from a centrally administrable source.

Figure 2:
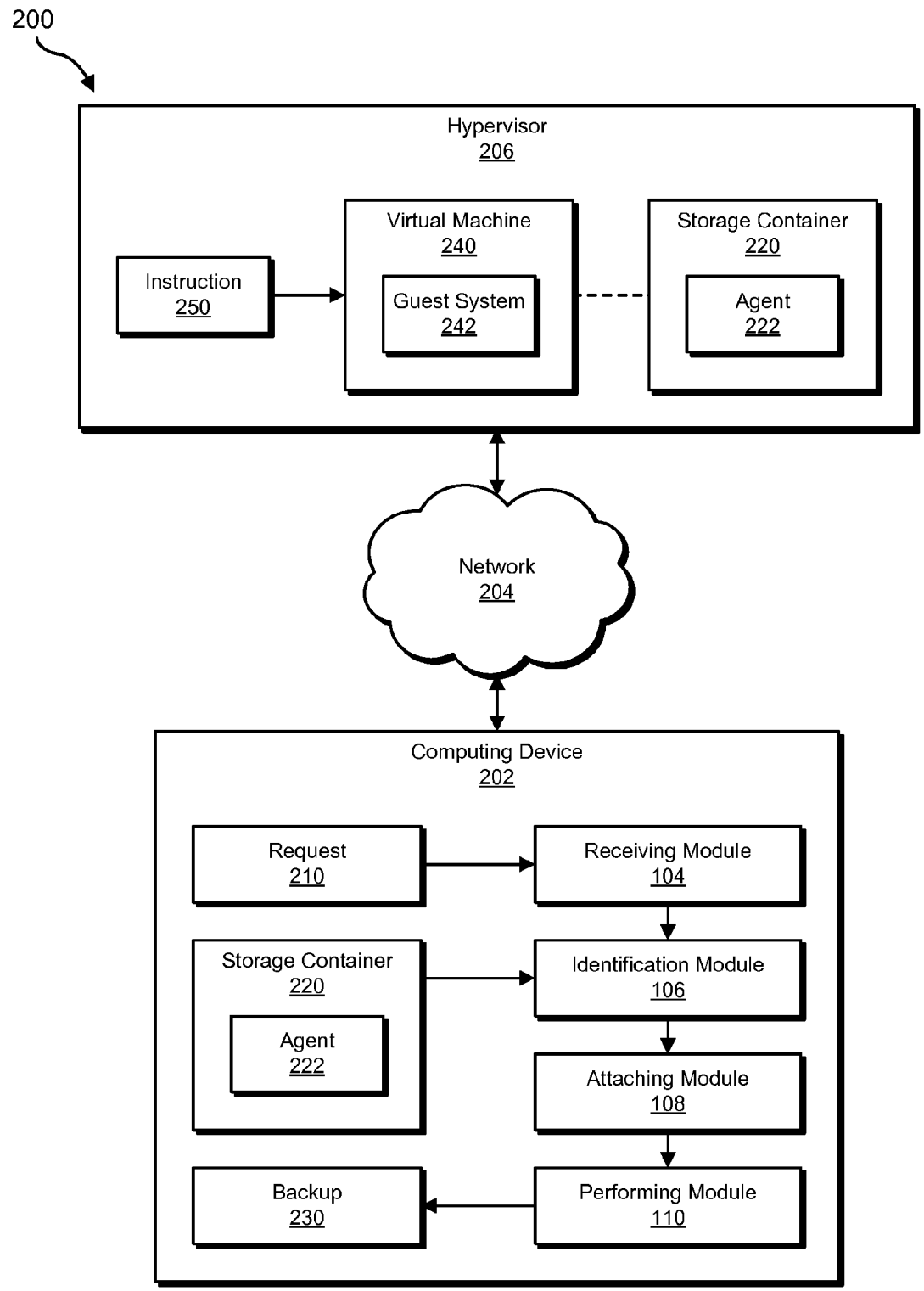
FIG. 2 is a block diagram of an exemplary system for protecting virtual machine data.
Figure 3:
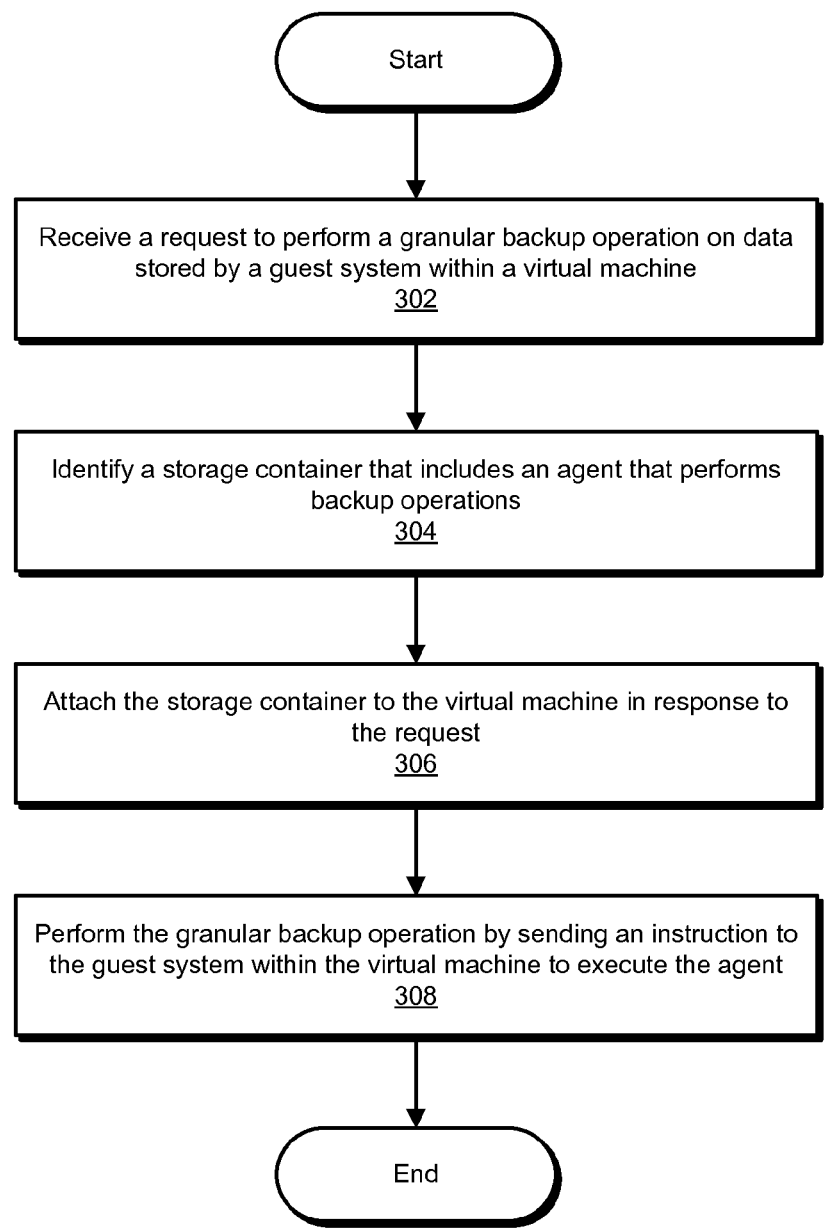
FIG. 3 is a flow diagram of an exemplary method for protecting virtual machine data.
Figure 4:
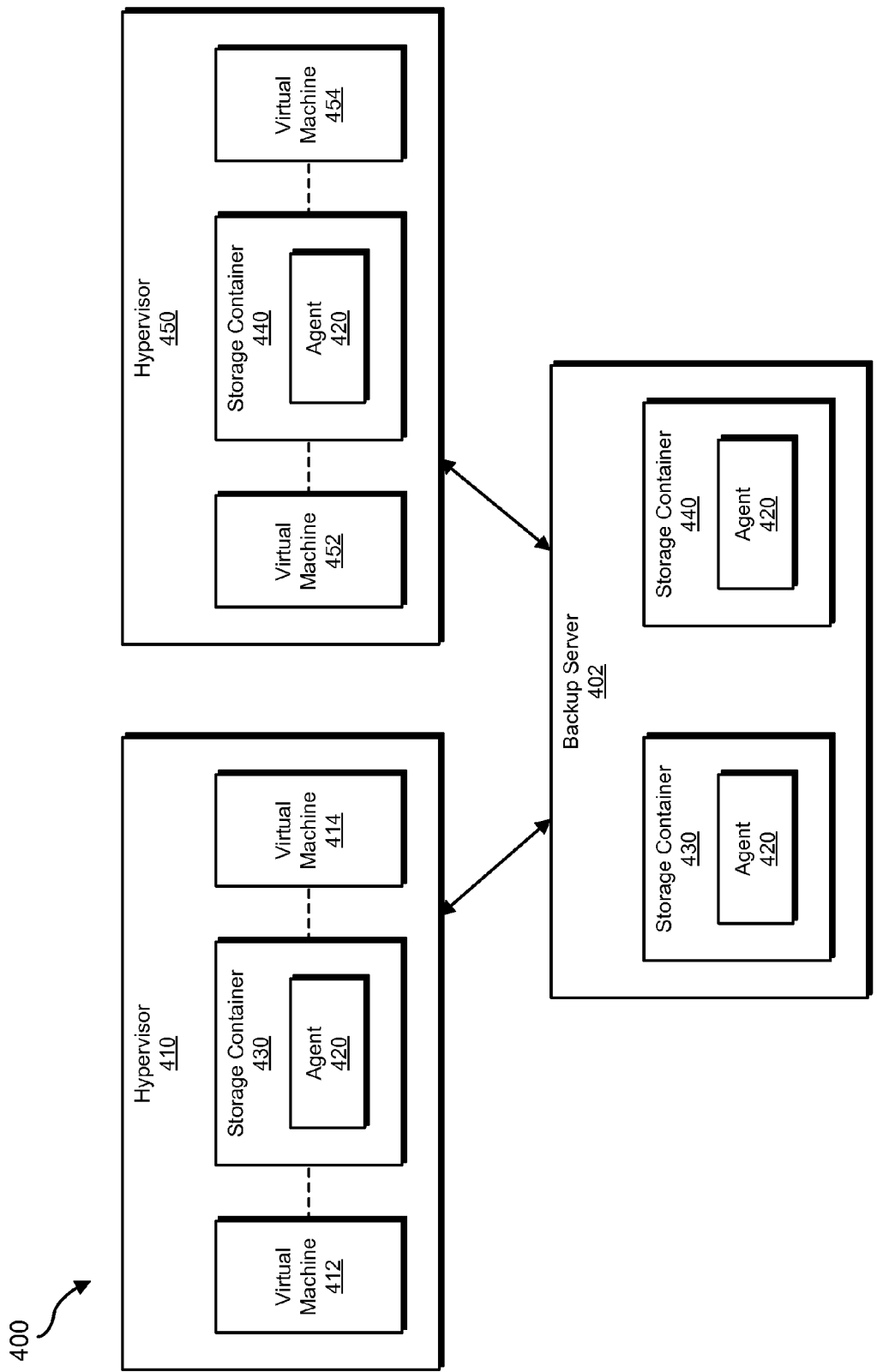
FIG. 4 is a block diagram of an exemplary system for protecting virtual machine data.

The following will provide, with reference to FIGS. 1, 2, and 4, detailed descriptions of exemplary systems for protecting virtual machine data. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for protecting virtual machine data. As illustrated in this figure, exemplary system 100 may include one or more modules 102 for performing one or more tasks. For example, and as will be explained in greater detail below, exemplary system 100 may include a receiving module 104 that may receive a request to perform a granular backup operation on data stored by a guest system within a virtual machine. Exemplary system 100 may additionally include an identification module 106 that may identify a storage container that may include an agent that performs backup operations. Exemplary system 100 may also include an attaching module 108 that may attach the storage container to the virtual machine in response to the request. Exemplary system 100 may additionally include a performing module 110 that may perform the granular backup operation by sending an instruction to the guest system within the virtual machine to execute the agent. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or hypervisor 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a storage container for a virtual machine. Database 120 may represent portions of a single database or computing device or a plurality of databases or computing devices. For example, database 120 may represent a portion of hypervisor 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as hypervisor 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a hypervisor 206 via a network 204. In one example, computing device 202 may be programmed with one or more of modules 102 and/or may store all or a portion of the data in database 120. Additionally or alternatively, hypervisor 206 may be programmed with one or more of modules 102 and/or may store all or a portion of the data in database 120.

In one embodiment, one or more of modules 102 from FIG. 1 may, when executed by at least one processor of computing device 202 and/or hypervisor 206, facilitate computing device 202 and/or hypervisor 206 in protecting virtual machine data. In one example, computing device 202 may represent a backup server that is configured to protect data within a guest system 242 at a granular level. For example, and as will be described in greater detail below, receiving module 104 may be programmed to receive a request 210 to perform a granular backup operation on data stored by a guest system 242 within a virtual machine 240. Identification module 106 may be programmed to identify a storage container 220 that may include an agent 222 that performs backup operations. Attaching module 108 may be programmed to attach storage container 220 to virtual machine 240 in response to request 210. Performing module 110 may be programmed to perform the granular backup operation (e.g., thereby generating a backup 230) by sending an instruction 250 to guest system 242 within virtual machine 240 to execute agent 222.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. In some examples, computing device 202 may represent a backup server.

Hypervisor 206 generally represents any type or form of virtualization platform and/or host capable of running and/or managing one or more virtual machines on a physical computing device. Examples of hypervisors include, without limitation, VMWARE ESX/ESXI, MICROSOFT HYPER-V, ORACLE VM, SUN VIRTUALBOX, CITRIX XENSERVER, any bare-metal hypervisor, and/or any hosted hypervisor. In some examples, the term "hypervisor" may refer to software executing on a physical computing device that manages the execution of virtual machines on the physical computing device and/or the physical computing device itself (e.g., a virtual machine manager).

Network 204 generally represents any medium or architecture capable of facilitating communication or data transfer. Examples of network 204 include, without limitation, an intranet, a Wide Area Network (WAN), a Local Area Network (LAN), a Storage Area network (SAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and hypervisor 206.

FIG. 3 is a flow diagram of an exemplary computer-implemented method 300 for protecting virtual machine data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive a request to perform a granular backup operation on data stored by a guest system within a virtual machine. For example, receiving module 104 may, as part of computing device 202 in FIG. 2, receive request 210 to perform a granular backup operation on data stored by guest system 242 within virtual machine 240.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

In addition, the phrase "guest system," as used herein, may refer to any operating system running within a virtualized environment, such as a virtual machine. A guest operating system may include any suitable operating system, such as MICROSOFT WINDOWS, UNIX, and/or LINUX.

As used herein, the phrase "backup operation" may refer to any operation related to backing up data, backed up data, implementing backup policies, and/or restoring backed up data. Accordingly, as used herein, the phrase "granular backup operation" may refer to any backup operation that targets a subset of data that is stored by a virtual machine. In some examples, the phrase "granular backup operation" may refer to a backup operation that leverages a view of a guest system within a virtual machine. Additionally or alternatively, the phrase "granular backup operation" may refer to a backup operation that is designed to be performed from within a running guest system. In some examples, the phrase "granular backup operation" may refer to a backup operation that backs up and/or restores application data (e.g., by generating and/or consuming metadata that relates backup data to the application and/or by interfacing with the application while the application executes). Additionally or alternatively, the phrase "granular backup operation" may refer to a backup operation that backs up and/or restores targeted files. In some examples, the phrase "granular backup operation" may refer to an operation that facilitates backing up and/or restoring data on a granular level (e.g., by generating and/or consuming metadata that relates to backup data from a view of a guest system within a virtual machine and/or by interfacing with an application that executes within a virtual machine).

Receiving module 104 may receive the request to perform the granular backup operation in any suitable context. For example, receiving module 104 may receive the request to perform the granular backup operation from a backup server. Additionally or alternatively, receiving module 104 may receive the request to perform the granular backup operation by executing a backup policy that specifies the granular backup operation.

Returning to FIG. 3, at step 304 one or more of the systems described herein may identify a storage container that may include an agent that performs backup operations. For example, identification module 106 may, as part of computing device 202 in FIG. 2, identify storage container 220 that may include agent 222 that performs backup operations.

As used herein, the term "agent" may refer to any program, module, daemon, script, and/or process capable of executing within a virtual machine and receiving and/or sending communications outside the virtual machine. In addition, the phrase "storage container," as used herein, generally refers to any file and/or data structure that a virtual machine may interface with, mount, read from, write to, and/or treat as a storage device for a guest system running within the virtual machine. Examples of storage containers may include virtual disk files (e.g., VMDK files, VHD files, VHDX files) and/or disk image files (e.g., ISO files).

Identification module 106 may identify the storage container in any suitable manner. For example, identification module 106 may identify a master storage container (e.g., that is accessible to a backup server). Additionally or alternatively, identification module 106 may identify an instance of a master storage container that is accessible to a hypervisor of the virtual machine. In some contexts, the systems described herein may provide storage containers for disparate hypervisors that consume differing types of storage containers (e.g., VMDK files for some hypervisors and VHD files for other hypervisors). In these contexts, the systems described herein may maintain (or generate on demand) a storage container for each type of hypervisor. Accordingly, identification module 106 may identify the storage container by identifying a storage container that is consumable by the corresponding hypervisor.

In one example, identification module 106 may provision one or more instances of the storage container to one or more virtual machine hosts and/or hypervisors. For example, identification module 106 may, as a part of a backup server configuration, identify information about one or more virtual infrastructure hosts. Identification module 106 may request and/or scan for a list of storage locations for instances of the storage container such that all virtual machines will have access to at list one storage location on the list. In some examples, identification module 106 may compute a minimum list of locations necessary to provide access to all virtual machines (e.g., in order to minimize the number of instances of the storage container). Identification module 106 may then create instances of the storage container at the determined locations within the virtualization infrastructure.

In some examples, identification module 106 may automatically generate one or more instances of the storage container (and/or may generate instances of the storage container in multiple formats but including the same agent). Additionally, in some examples, identification module 106 may automatically regenerate and/or update one or more instances of the storage container when the agent is updated and/or a backup server that interfaces with the agent is updated.

To provide an example of a virtualization infrastructure in which identification module 106 may operate, FIG. 4 illustrates an exemplary system 400. As shown in FIG. 4, system 400 may include a backup server 402 that is in communication with a hypervisor 410 that hosts virtual machines 412 and 414 and with a hypervisor 450 that hosts virtual machines 452 and 454. In one example, hypervisor 410 may consume one type of storage container (e.g., corresponding to a storage container 430) and hypervisor 450 may consume another type of storage container (e.g., corresponding to a storage container 440). Accordingly, identification module 106 may, as a part of backup server 402, identify storage container 430 containing an agent 420 in response to a request to perform a granular backup operation on data stored by virtual machine 412 or virtual machine 414. Likewise, identification module 106 may, as a part of backup server 402, identify storage container 440 containing agent 420 in response to a request to perform a granular backup operation on data stored by virtual machine 452 or virtual machine 454.

Returning to FIG. 3, at step 306 one or more of the systems described herein may attach the storage container to the virtual machine in response to the request. For example, attaching module 108 may, as part of computing device 202 in FIG. 2, attach storage container 220 to virtual machine 240 in response to request 210.

Attaching module 108 may attach the storage container to the virtual machine in any suitable manner. For example, attaching module 108 may attach the storage container to the virtual machine by sending an instruction to a hypervisor of the virtual machine to attach and/or mount the storage container to the virtual machine. Additionally or alternatively, attaching module 108 may attach the storage container to the virtual machine by providing the storage container as a disk image (e.g., an ISO file) to a virtual device (e.g., a virtual DVD-ROM device) of the virtual machine. In some examples, attaching module 108 may send an instruction to the hypervisor via an application programming interface ("API") of the hypervisor.

As mentioned earlier, in some examples the systems described herein may provide the storage container to multiple virtual machines. For example, attaching module 108 may also attach the storage container to one or more additional virtual machines to perform one or more additional granular backup operations on data stored by an additional guest system within the additional virtual machine. Additionally or alternatively, attaching module 108 may attach an additional instance of the storage container to at least one additional virtual machine to perform at least one additional granular backup operation on data stored by an additional guest system within the additional virtual machine. Using FIG. 4 as an example, attaching module 108 may attach storage container 430 to virtual machine 412 at one time and attach storage container 430 to virtual machine 414 at another time. As another example, attaching module 108 may attach storage container 430 to virtual machine 412 and attach storage container 440 to virtual machine 452.

Returning to FIG. 3, at step 308 one or more of the systems described herein may perform the granular backup operation by sending an instruction to the guest system within the virtual machine to execute the agent. For example, performing module 110 may, as part of computing device 202 in FIG. 2, perform the granular backup operation by sending instruction 250 to guest system 242 within virtual machine 240 to execute agent 222.

In some examples, performing module 110 may perform the granular backup operation by configuring the guest system to execute the agent after attaching the storage container to the virtual machine and before executing the agent. For example, performing module 110 may log in to the virtual machine and execute one or more scripts, programs, and/or tools (e.g., that are stored within the storage container) to make the agent executable by the guest system. For example, performing module 110 may modify a registry and/or configuration of the guest system, may create symbolic links to one or more executable files, and/or configure one or more devices to prepare to execute the agent.

The agent may perform the granular backup operation in any suitable manner. For example, the agent may collect metadata within the guest system that describes backup data produced by the granular backup operation. In examples of granular restorations, the agent may use previously collected metadata to interpret backup data to be restored.

In some examples, the agent may quiesce an application within the guest system to prepare data corresponding to the application for the granular backup operation. As used herein, the term "quiesce" may refer to any operation for temporarily pausing, stopping, and/or intercepting new transactions (e.g., input/output operations) on a system and/or resource. In some examples, quiescing may also entail completing transactions in progress to ensure a consistent state of a system and/or resource. Additionally, in some examples, the agent may create a snapshot of the application data before resuming the application.

In some examples, once the agent has collected metadata and/or performed other operations in preparation for performing granular backups, a host of the virtual machine may back up the virtual machine (e.g., a virtual disk file that provides storage for the virtual machine) in connection with the metadata prepared by the agent. For example, performing module 110 and/or the agent may send an instruction to the host to back up the virtual machine data (e.g., along with the metadata).

After performing the granular backup operation, in some examples performing module 110 may revert changes previously made to the guest system to prepare for executing the agent. For example, performing module 110 may stop execution of the agent, remove registry keys, remove symbolic links, and/or remove device configurations. In some examples, performing module 110 may detach the storage container from the virtual machine in response to completing the granular backup operation. For example, performing module 110 may send an instruction to a hypervisor of the virtual machine to detach the storage container.

As explained above in connection with method 300 in FIG. 3, by attaching a storage container that includes a backup agent to one or more virtual machines and executing the backup agent from within the virtual machines, the systems and methods described herein may provision multiple virtual machines with granular backup and/or restore capabilities from a centrally administrable source. In some examples, if an update to a backup/recovery server is applied that contains a new storage container, the new storage container may be pushed throughout a virtualization infrastructure to become accessible to virtual machines throughout the virtualization infrastructure that are protected by the backup/recovery server. The systems described herein may thereby provide a one-to-many configuration of agent code to virtual machines. An update to a single storage container may thereby become available for many virtual machines, thereby providing scalability and reducing maintenance requirements for providing granular backup and restore capabilities for virtual machine data.

In one example, all agent code required for virtual machine backup and recovery operations may be maintained in a hypervisor-specific storage container on a backup server. When a hypervisor is registered with the backup server, the systems described herein may push out the appropriate hypervisor-specific storage container to the hypervisor host to make the storage container available to all virtual machines. When a virtual machine backup or data recovery operation is initiated, the systems described herein may automatically attach and/or mount the storage container to the virtual machine. These systems and/or the backup server may then access the virtual machine, configure the guest system for executing the agent, and then execute the agent. Once the agent is running, the agent may perform one or more steps for preparing for backup and/or data recovery operations. Once the preparation steps are complete, the systems described herein may begin the process to detach the storage container. When updates are applied to the backup server, the systems described herein may automatically resend the storage container or containers to any registered hypervisors, thereby automatically updating the agents for hundreds or thousands of virtual machines in a short period of time. In some examples, no agent may be installed in the guest system, but the guest system may be able to execute the agent. Additionally, in some examples, the above steps may function for each version of an operating system and may provide a true single-source solution to providing granular backup and restore capabilities (as opposed to, e.g., linked-clone technologies).

Figure 5:
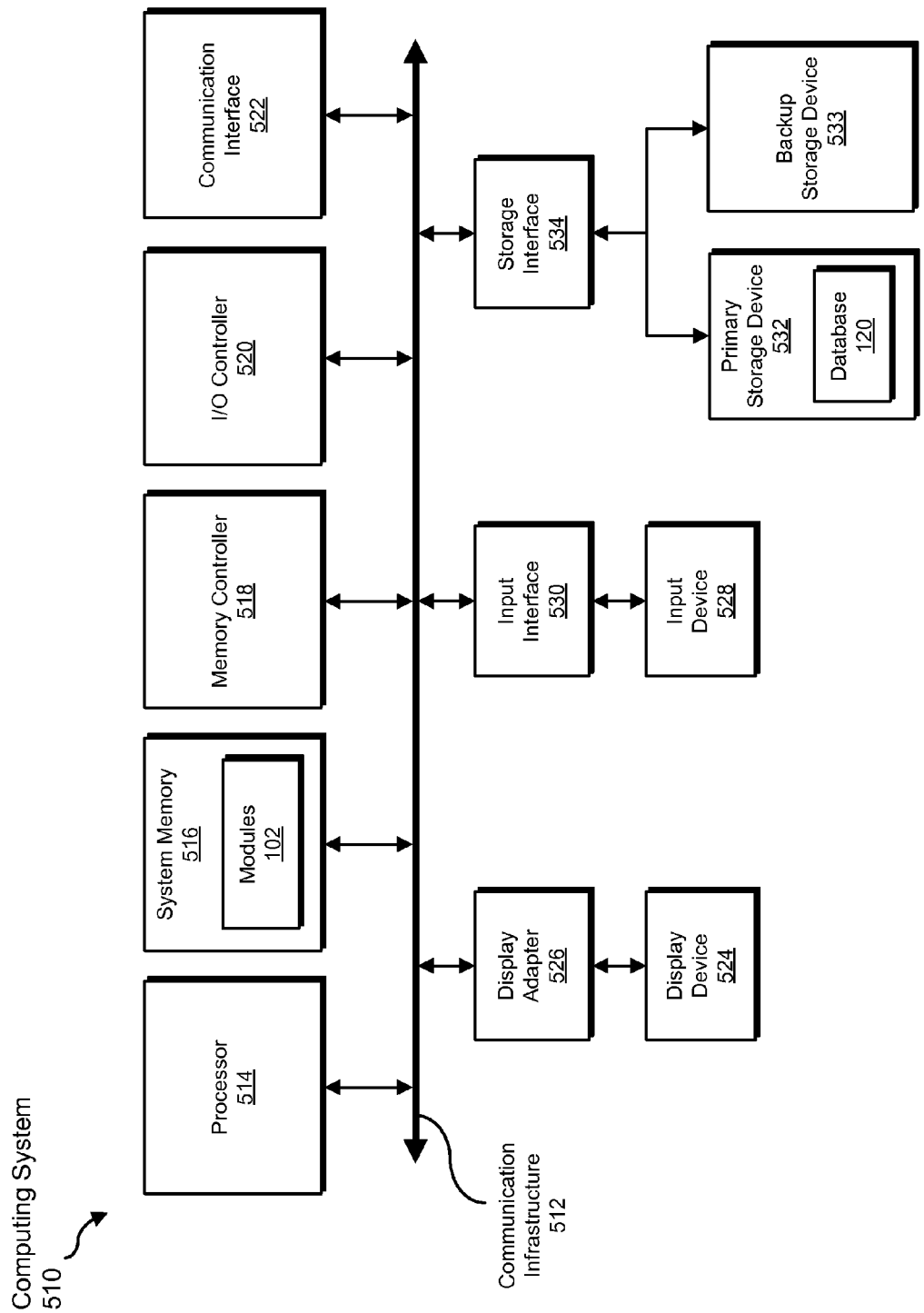
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
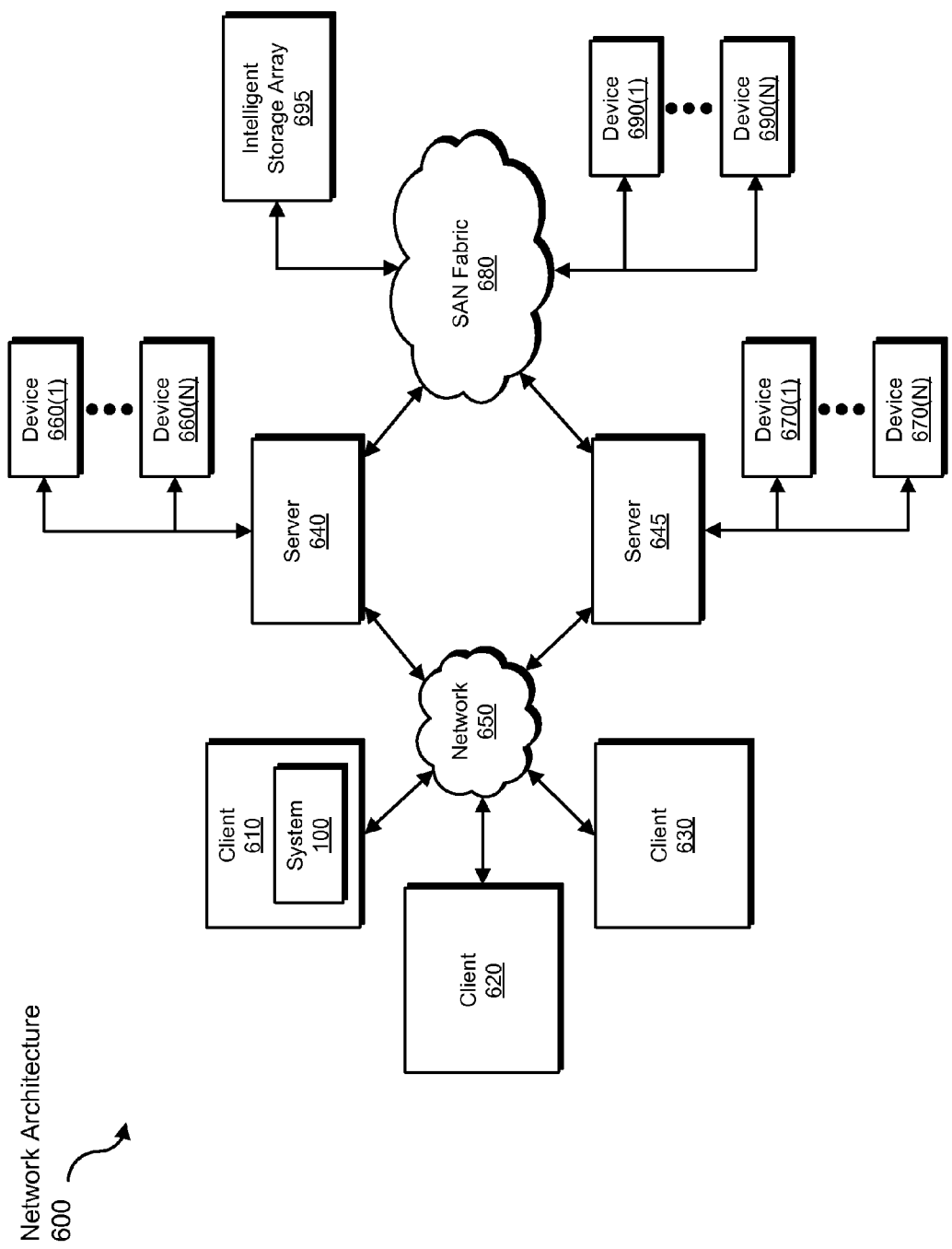
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for protecting virtual machine data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a backup request to be transformed, transform the backup request into a virtual machine with an attached storage container, output a result of the transformation to a hypervisor, use the result of the transformation to perform one or more granular backup operations, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting virtual machine data, at least a portion of the method being performed by a computing device comprising at least one processor, the method comprising:
   receiving a request to perform a granular backup operation on data stored by a guest system within a virtual machine;
   identifying a storage container provided for use by the virtual machine that comprises an agent that performs backup operations;
   attaching the storage container to the virtual machine in response to the request;
   performing the granular backup operation without writing the agent to the guest system within the virtual machine by sending an instruction to the guest system within the virtual machine to execute the agent from the storage container without installing the agent from the storage container to the guest system;
   updating granular backup capabilities for the virtual machine without writing to the guest system within the virtual machine by:
      receiving a subsequent request to perform a granular backup operation on data stored by the guest system within the virtual machine;
      identifying a new storage container provided for use by the virtual machine that has replaced the storage container and that comprises an updated agent that performs backup operations;
      attaching the new storage container instead of the storage container to the virtual machine.

2. The computer-implemented method of claim 1, further comprising attaching the storage container to at least one additional virtual machine to perform at least one additional granular backup operation on data stored by an additional guest system within the additional virtual machine.

3. The computer-implemented method of claim 1, further comprising attaching an additional instance of the storage container to at least one additional virtual machine to perform at least one additional granular backup operation on data stored by an additional guest system within the additional virtual machine.

4. The computer-implemented method of claim 1, wherein performing the granular backup operation comprises configuring the guest system to execute the agent after attaching the storage container to the virtual machine and before executing the agent.

5. The computer-implemented method of claim 1, wherein the agent collects metadata from within the guest system that describes backup data produced by the granular backup operation.

6. The computer-implemented method of claim 1, wherein the agent quiesces at least one application within the guest system to prepare data corresponding to the application for the granular backup operation.

7. The computer-implemented method of claim 1, further comprising detaching the storage container from the virtual machine in response to completing the granular backup operation.

8. The computer-implemented method of claim 1, wherein the granular backup operation comprises a granular restoration operation that restores data to the guest system within the virtual machine.

9. A system for protecting virtual machine data, the system comprising:
- a receiving module that receives a request to perform a granular backup operation on data stored by a guest system within a virtual machine;
- an identification module that identifies a storage container provided for use by the virtual machine that by an agent that performs backup operations;
- an attaching module that attaches the storage container to the virtual machine in response to the request;
- a performing module that performs the granular backup operation without writing the agent to the guest system within the virtual machine by sending an instruction to the guest system within the virtual machine to execute the agent from the storage container without installing the agent from the storage container to the guest system;
- wherein the identification module further updates granular backup capabilities for the virtual machine without writing to the guest system within the virtual machine by:
  - receiving a subsequent request to perform a granular backup operation on data stored by the guest system within the virtual machine;
  - identifying a new storage container provided for use by the virtual machine that has replaced the storage container and that comprises an updated agent that performs backup operations;
  - attaching the new storage container instead of the storage container to the virtual machine;
- the system further comprising at least one processor configured to execute the receiving module, the identification module, the attaching module, and the performing module.

10. The system of claim 9, wherein the attaching module is further programmed to attach the storage container to at least one additional virtual machine to perform at least one additional granular backup operation on data stored by an additional guest system within the additional virtual machine.

11. The system of claim 9, wherein the attaching module is further programmed to attach an additional instance of the storage container to at least one additional virtual machine to perform at least one additional granular backup operation on data stored by an additional guest system within the additional virtual machine.

12. The system of claim 9, wherein the performing module performs the granular backup operation by configuring the guest system to execute the agent after attaching the storage container to the virtual machine and before executing the agent.

13. The system of claim 9, wherein the agent collects metadata from within the guest system that describes backup data produced by the granular backup operation.

14. The system of claim 9, wherein the agent quiesces at least one application within the guest system to prepare data corresponding to the application for the granular backup operation.

15. The system of claim 9, wherein the performing module is further programmed to detach the storage container from the virtual machine in response to completing the granular backup operation.

16. The system of claim 9, wherein the granular backup operation comprises a granular restoration operation that restores data to the guest system within the virtual machine.

17. A non-transitory computer-readable-storage medium comprising one or more computer-readable instructions that, when executed by at least one processor of a computing device, cause the computing device to:
- receive a request to perform a granular backup operation on data stored by a guest system within a virtual machine;
- identify a storage container provided for use by the virtual machine that comprises an agent that performs backup operations;
- attach the storage container to the virtual machine in response to the request;
- perform the granular backup operation without writing the agent to the guest system within the virtual machine by sending an instruction to the guest system within the virtual machine to execute the agent from the storage container without installing the agent from the storage container to the guest system;
- updates granular backup capabilities for the virtual machine without writing to the guest system within the virtual machine by:
  - receiving a subsequent request to perform a granular backup operation on data stored by the guest system within the virtual machine;
  - identifying a new storage container provided for use by the virtual machine that has replaced the storage container and that comprises an updated agent that performs backup operations;
  - attaching the new storage container instead of the storage container to the virtual machine.

18. The non-transitory computer-readable-storage medium of claim 17, wherein the one or more computer-readable instructions cause the computing device to attach the storage container to at least one additional virtual machine to perform at least one additional granular backup operation on data stored by an additional guest system within the additional virtual machine.

19. The non-transitory computer-readable-storage medium of claim 17, wherein the one or more computer-readable instructions cause the computing device to attach an additional instance of the storage container to at least one additional virtual machine to perform at least one additional granular backup operation on data stored by an additional guest system within the additional virtual machine.

20. The non-transitory computer-readable-storage medium of claim 17, wherein the one or more computer-readable instructions cause the computing device to perform the granular backup operation by configuring the guest system to execute the agent after attaching the storage container to the virtual machine and before executing the agent.

* * * * *